United States Patent
Nenninger

(10) Patent No.: US 11,001,417 B1
(45) Date of Patent: May 11, 2021

(54) REUSABLE SEALING SYSTEM FOR CAULK TUBE OR SIMILAR DISPENSER

(71) Applicant: Casey Tools, a LLC, Naperville, IL (US)

(72) Inventor: Charles Nenninger, Cape Girardeau, MO (US)

( * ) Notice: Subject to any disclaimer, the term of this patent is extended or adjusted under 35 U.S.C. 154(b) by 0 days.

(21) Appl. No.: 16/740,092

(22) Filed: Jan. 10, 2020

Related U.S. Application Data

(60) Provisional application No. 62/791,835, filed on Jan. 13, 2019.

(51) Int. Cl.
  *B65D 41/02* (2006.01)
  *B05C 17/005* (2006.01)
  *B65D 83/00* (2006.01)

(52) U.S. Cl.
  CPC ........ *B65D 41/023* (2013.01); *B05C 17/0052* (2013.01); *B65D 83/0005* (2013.01)

(58) Field of Classification Search
  CPC .............. B65D 41/023; B65D 83/0005; B05C 17/0052
  USPC ................................. 222/546, 562, 551, 553
  See application file for complete search history.

(56) References Cited

U.S. PATENT DOCUMENTS

| | | | | |
|---|---|---|---|---|
| 2,754,033 A | * | 7/1956 | Etter ........................ | B41L 27/02 222/326 |
| D289,682 S | * | 5/1987 | Dragan ......................... | D24/112 |
| 4,682,950 A | * | 7/1987 | Dragan ..................... | A61C 5/62 222/575 |
| D292,825 S | * | 11/1987 | Dragan ......................... | D24/112 |
| 4,767,326 A | * | 8/1988 | Bennett ................ | A61C 9/0026 433/89 |
| 4,963,093 A | * | 10/1990 | Dragan ..................... | A61C 5/66 433/90 |
| D315,956 S | * | 4/1991 | Dragan ......................... | D24/112 |
| 5,100,320 A | * | 3/1992 | Martin ..................... | A61C 5/66 433/90 |
| D353,673 S | * | 12/1994 | Discko, Jr. ................... | D24/152 |
| 5,722,830 A | * | 3/1998 | Brandhorst .......... | A61C 9/0026 433/89 |
| 6,099,307 A | * | 8/2000 | Discko, Jr. ............... | A61C 5/66 433/90 |

(Continued)

OTHER PUBLICATIONS

Dome _ Definition of Dome by Merriam-Webster, obtained on Aug. 3, 2020 from https://www.merriam-webster.com/dictionary/dome.*

(Continued)

*Primary Examiner* — Paul R Durand
*Assistant Examiner* — Randall A Gruby
(74) *Attorney, Agent, or Firm* — Gugliotta & Gugliotta LPA

(57) ABSTRACT

A reusable sealing system is provided for caulk tube or similar bulk dispense. A sealing system forms a cylindrical, pliable member having an access orifice at a proximal end and a sealed dome at an opposite, distal end. The sealing system has an overall length of approximately 3½ inches. The access orifice forms an opening diameter of approximately ⅝" nominal internal diameter. The sealed dome formed as a flattened extension of a pliable sidewall. A pliable sidewall is formed of a resilient elastomeric material, such as a silicone or a plastic, and is adapted to receive a tip of the nozzle n a contiguously contacting manner.

3 Claims, 4 Drawing Sheets

(56) References Cited

U.S. PATENT DOCUMENTS

| | | | | |
|---|---|---|---|---|
| 6,261,094 B1* | 7/2001 | Dragan | ............... | A61C 5/66 |
| | | | | 433/90 |
| 6,398,085 B2* | 6/2002 | Foster | ............... | B05C 17/0052 |
| | | | | 222/546 |
| 6,422,866 B2* | 7/2002 | Dragan | ............... | B05C 17/00593 |
| | | | | 215/252 |
| 6,524,103 B1* | 2/2003 | Winkler | ............... | B05C 17/00593 |
| | | | | 222/575 |
| 6,564,970 B1* | 5/2003 | Walch | ............... | B05C 17/00586 |
| | | | | 222/82 |
| 6,585,511 B2* | 7/2003 | Dragan | ............... | B05C 17/00593 |
| | | | | 401/176 |
| 7,086,861 B2* | 8/2006 | Pitz | ............... | A61C 5/62 |
| | | | | 401/1 |
| 8,522,994 B2* | 9/2013 | Weiler | ............... | B65D 1/095 |
| | | | | 220/276 |
| 8,556,870 B2* | 10/2013 | Fundingsland | ............... | A61C 5/62 |
| | | | | 604/311 |
| 9,131,991 B2* | 9/2015 | Walter | ............... | A61C 5/50 |
| D788,927 S * | 6/2017 | Yao | ............... | D24/176 |
| 10,004,832 B2* | 6/2018 | Yotsutsuji | ............... | A61L 31/048 |
| 10,179,678 B2* | 1/2019 | Oliveira | ............... | B65D 1/095 |
| 10,376,340 B2* | 8/2019 | Pruett | ............... | A61C 5/66 |
| D861,160 S * | 9/2019 | Broyles | ............... | D24/127 |
| 10,435,206 B2* | 10/2019 | Schlegel | ............... | F16J 15/062 |
| D875,948 S * | 2/2020 | Pieroni | ............... | D24/176 |
| 2001/0048198 A1* | 12/2001 | Dulin | ............... | B65D 35/44 |
| | | | | 277/316 |
| 2004/0226968 A1* | 11/2004 | Lafond | ............... | B05C 17/00559 |
| | | | | 222/327 |
| 2005/0230439 A1* | 10/2005 | McKee | ............... | B65D 41/0442 |
| | | | | 222/568 |
| 2005/0279776 A1* | 12/2005 | Decottignies | ............... | B65D 1/32 |
| | | | | 222/386 |
| 2020/0164324 A1* | 5/2020 | Towler | ............... | B05C 17/00566 |

OTHER PUBLICATIONS

Rollable _ Definition of Rollable by Merriam-Webster; obtained on Jan. 15, 2021 from Merriam-Webster Dictionary online.*

Roll _ Definition of Rollable by Merriam-Webster; obtained on Jan. 15, 2021 from Merriam-Webster Dictionary online.*

* cited by examiner

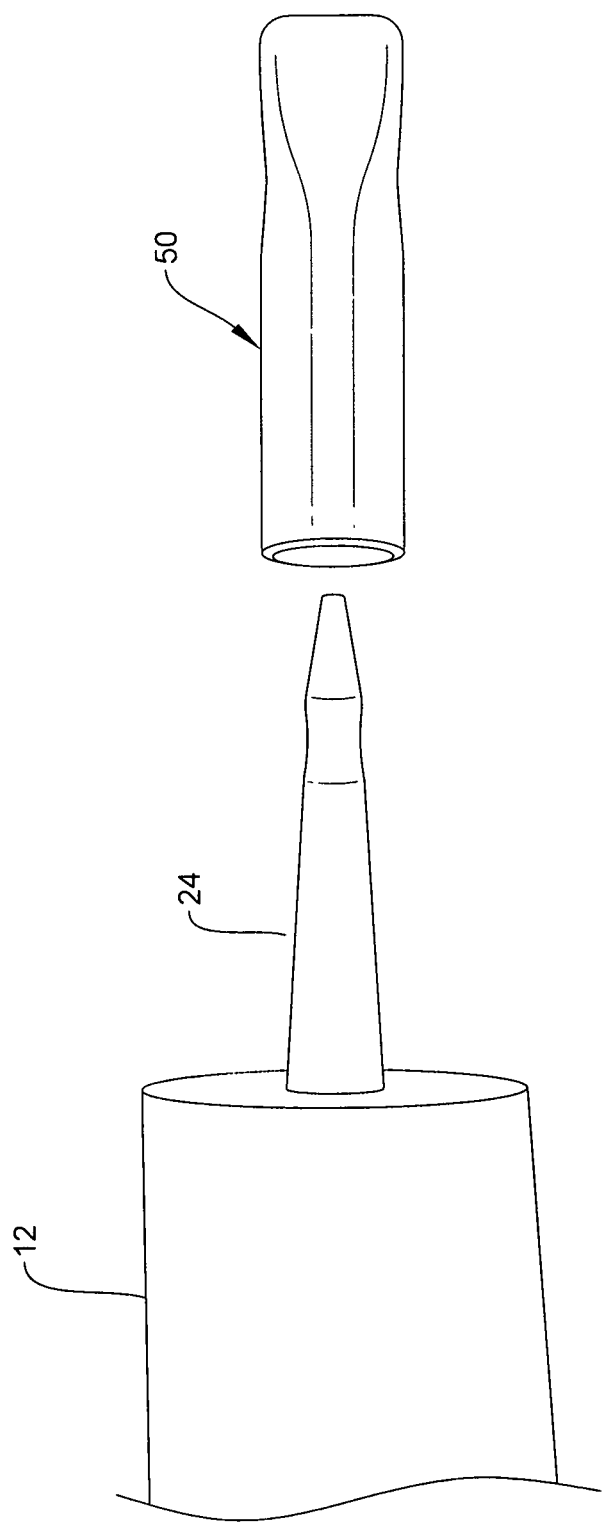

REUSABLE SEALING SYSTEM FOR CAULK TUBE OR SIMILAR DISPENSER

RELATED APPLICATIONS

The present invention claims the benefit of U.S. Provisional Patent Application 62/791,835, filed on Jan. 12, 2019 and incorporated by reference as if fully rewritten herein.

BACKGROUND OF THE INVENTION

1. Field of the Invention

The present invention relates generally to bulk liquid construction materials such as caulking, adhesives or the like and, more particularly, to a reusable sealing system that allows for storage within and intermittent use from original nozzled cylindrical dispensing tubes.

2. Description of the Related Art

Caulk, construction adhesives and other similar materials are bulk dispensed from disposable cartridges formed of rigid cylindrical cardboard or plastic tubes with an applicator tip at one end. The flowable material inside the cylinder is dispensed by a movable plunger at a proximal end being urged toward a nozzle formed at a distal end of the cylinder. The movable plunger may be urged using a caulking guns or similar tool, which typically have a trigger connected to a rod which pushes the plunger, and has a ratchet to prevent backlash. The push rod may also be actuated by a motor or by compressed air. Similar mechanisms are used for grease guns.

For smaller applications, caulk, construction adhesive or other similar materials may be distributed in squeezable tubes. However, since these materials are best and most efficiently distributed, sold and used in bulk, and while a number of different standards exist for such bulk containers, the vast majority of such materials are available in a standard sized, nominal 10 oz tube that is capable of being used in conjunction with a standard sized, nominal 9 inch caulk gun tool.

In dispensing such bulk material, fluid communication with the material is generally accessed by removing the sealed tip of a plastic nozzle formed at the distal end of the cylinder. However, once dispensing has begun from an opened bulk cylinder, if a user only has a need for a portion of the contents there is no simple or easy way of resealing the container in order save for later use. As a result, the material within usually sets or otherwise becomes unusable after prolonged access to the atmosphere.

Some methods and devices are known that allow for the storage of caulk or similar bulk materials that are contained within unsealed cylinders. For example:

U.S. Pat. No. 9,796,508 issued in the name of Rutherford discloses a caulk storage system for storing an opened typical calk container including a cylindrical and a spout. The calk container may contain a fluid calk. A pair of cylinders is provided. The cylinders are matable to each other to define a closed tube. The calk container is positioned in each of the cylinders when the cylinders are mated together. Thus, the pair of cylinders inhibits the fluid calk from drying thereby facilitating the calk container to be stored when the calk container is opened.

While such a solution is efficacious, it is bulky, making it difficult to ship, stock, or store when not being used. Such bulk further increased the cost and efficiency. By way of example, if such a caulk storage system costs significantly more than a single bulk tube of material, it is highly unlikely to be purchased by anyone other than the repeated user such as a contractor, builder or professional property manager. However, it is the casual user, such as a homeowner, who is most likely to have the intermittent need for a partial tube volume of caulk, adhesive, etc.

Consequently, a need exists for a caulk storage system that is small, efficient, inexpensive, easy to use and capable of securing a portion of fluid caulk or similar material in situ within its original bulk tube.

SUMMARY OF THE INVENTION

It is thus an object of the present invention to provide a reusable sealing system for a caulk tube or similar bulk dispenser.

It is a feature of the present invention to provide a reusable sealing system that allows for storage within and intermittent use from original nozzled cylindrical dispensing tubes.

The present invention provides a reusable sealing system for caulk tubes or similar bulk dispense. A sealing system forms a cylindrical, pliable member having an access orifice at a proximal end and a sealed dome at an opposite, distal end. The sealing system has an overall length of approximately 3½ inches. The access orifice forms an opening diameter of approximately ⅝" nominal internal diameter. The sealed dome formed as a flattened extension of a pliable sidewall. A pliable sidewall is formed of a resilient elastomeric material, such as a silicone or a plastic, and is adapted to receive and encase a tip of the nozzle of a caulk tube or similar flow gun bulk dispenser device in a contiguously contacting manner.

It is an advantage of the present invention to provide for efficacious sealing of such partially dispensed bulk material within its dispensing tube.

Further, the present sealing system can flatten for easy storage or shipping and is extremely cost effective to implement relative to the cost of the original bulk material being stored.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 9 is a photograph of an exemplary prototype of a reusable sealing system 50 as shown in FIG. 7.

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
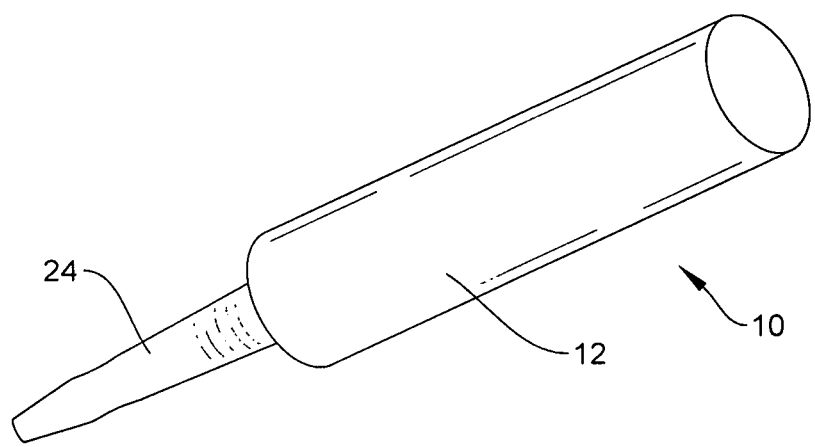
FIG. 1 is a proximal perspective view of a caulk or similar material bulk container 10 according to the PRIOR ART.
Figure 2:
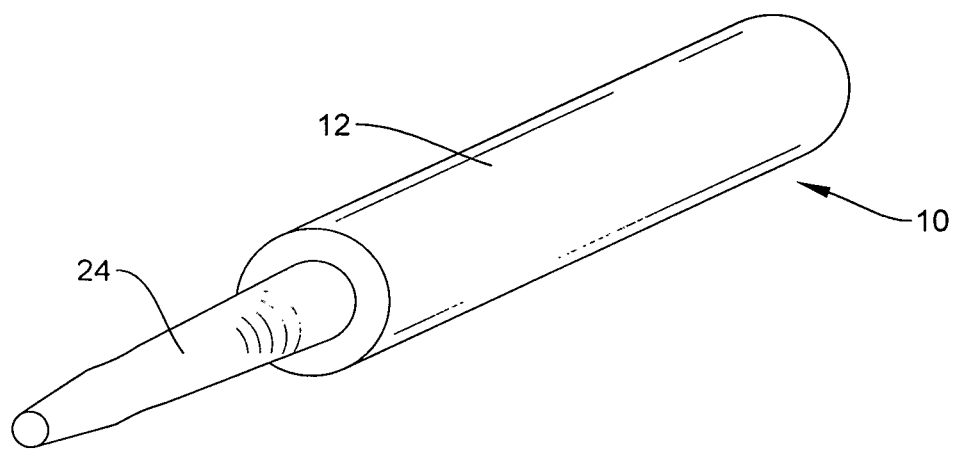
FIG. 2 is a distal perspective view thereof according to the PRIOR ART.
Figure 3:
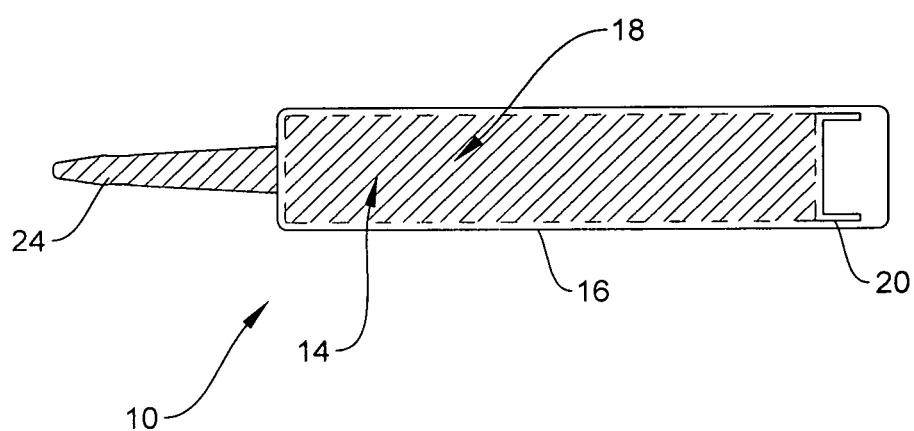
FIG. 3 is a side elevational view thereof according to the PRIOR ART.
Figure 4:
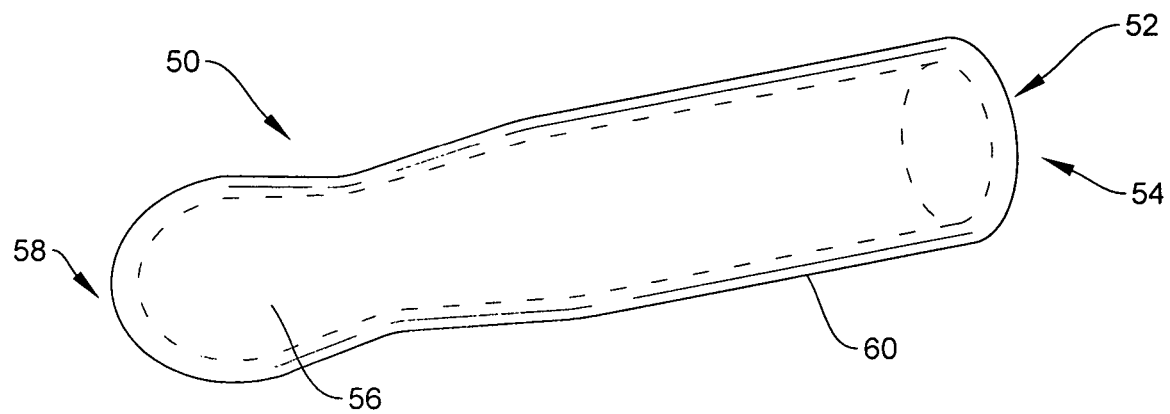
FIG. 4 is a distal perspective view of a reusable sealing system according to the preferred embodiment of the present invention for use in conjunction with a caulk tube or similar bulk dispenser.
Figure 5:
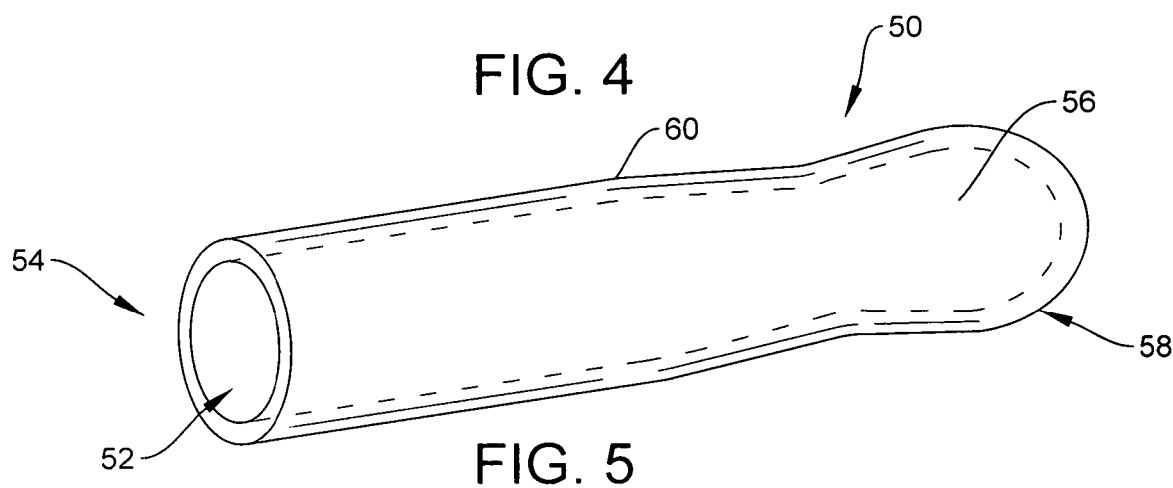
FIG. 5 is a proximal perspective view thereof.
Figure 6:
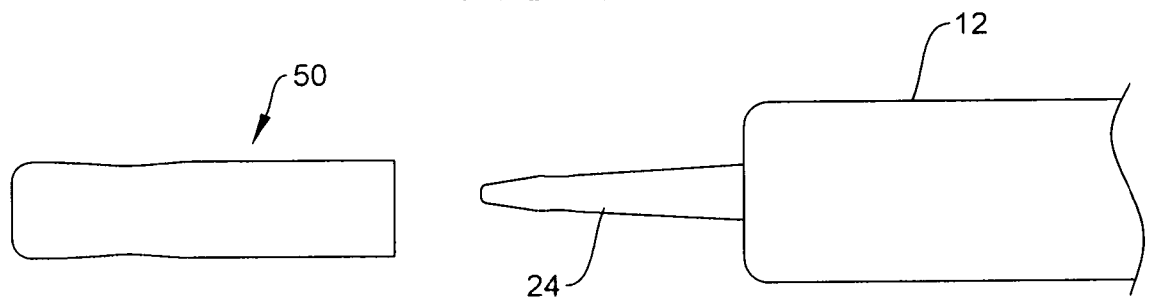
FIG. 6 is a side elevational view thereof, shown in conjunction with a caulk tube or similar bulk dispenser of FIG. 1 through FIG. 3, shown herein in a removed configuration.
Figure 7:
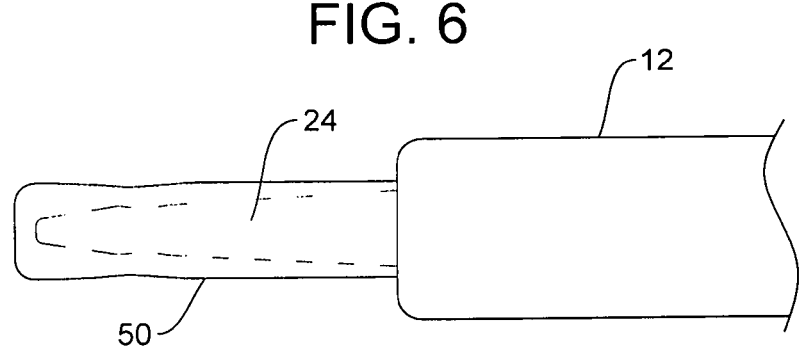
FIG. 7 is a side elevational view thereof, shown in conjunction with a caulk tube or similar bulk dispenser of FIG. 1 through FIG. 3, shown herein in an attached and sealed configuration.
Figure 8:
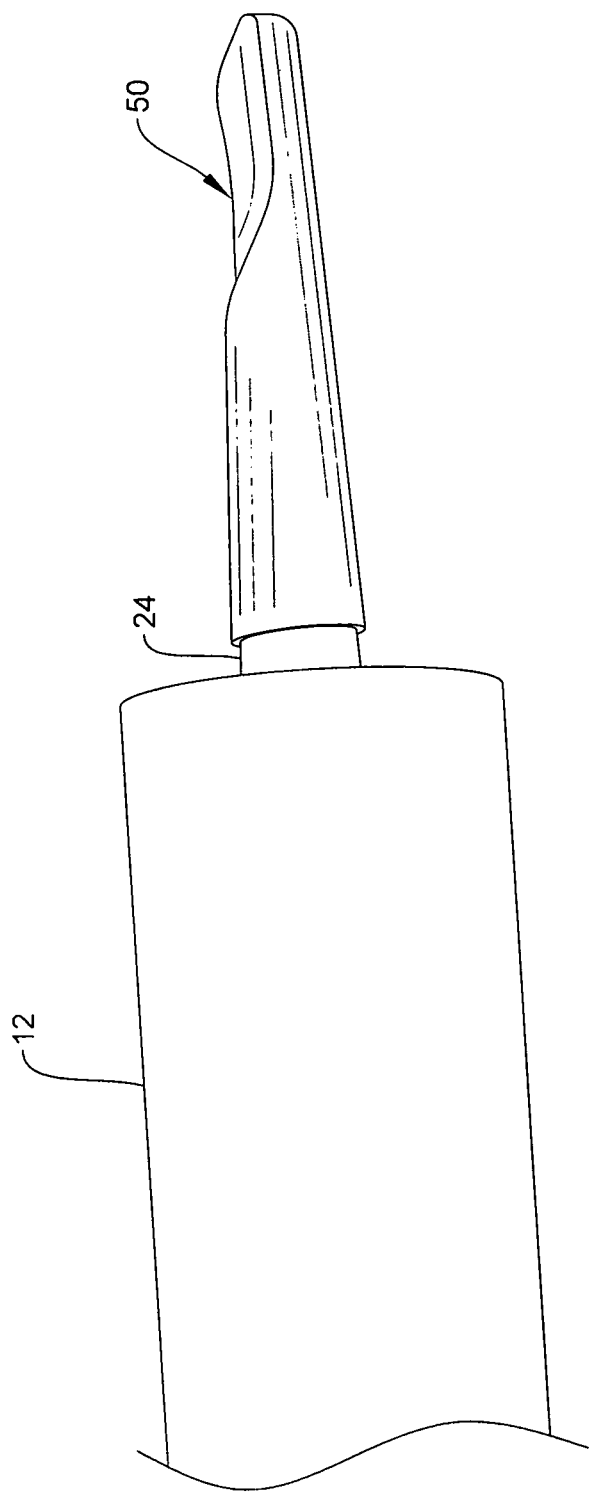
FIG. 8 is a photograph of an exemplary prototype of a reusable sealing system 50 as shown in FIG. 6.

Referring now to FIG. 1 through FIG. 3, a bulk container 10 is shown according to the PRIOR ART in which a hollow cylindrical container 12 is used to contain caulk or similar material. Caulk, construction adhesives and other similar materials are bulk dispensed from disposable cartridges formed of rigid cylindrical cardboard or plastic tubes with an applicator tip at one end. As would be apparent to one having ordinary skill in the relevant art, the use of such a cylindrical storage and dispensing container for bulk materials should be broadly construed within a wide range of equivalent or similar materials, and should not be restricted in any manner by differences in the character, function or use of the flowable material 18 inside the cylinder 12.

The cylinder 12 forms an internal volume 14 circumscribed by a cylindrically sidewall 16. The flowable material 18 is dispensed by a movable plunger 20 at a proximal end 22 being urged toward a nozzle 24 formed at a distal end 26 of the cylinder 12. The movable plunger 20 may be urged using a caulking guns or similar tool (not shown), which typically have a trigger connected to a rod which pushes the plunger, and has a ratchet to prevent backlash. The push rod may also be actuated by a motor Referring now to FIG. 4 through FIG. 7, wherein like reference numerals indicate the same parts throughout the several views, a reusable sealing system, generally noted as 50, is shown according to the preferred embodiment of the present invention for use in conjunction with the caulk tube or similar bulk dispenser 10 as shown in FIG. 1 through FIG. 3. The sealing system 50 forms a generally cylindrical; member being at least partially pliable or malleable and having an access orifice 52 at a proximal end 54 and a sealed dome 56 at an opposite, distal end 58. The cylindrical member may taper between the proximal end 56 and the distal end 58. The system 50 has an overall length of approximately 3½ inches. Further, the access orifice 52 has an opening diameter of approximately ⅝" nominal internal diameter.

The sealed dome 56 is formed as a flattened extension of the pliable or malleable portion of a sidewall 60. The sidewall 60 may be at least partially formed of a resilient elastomeric material. The resilient, elastomeric sidewall 60 may be formed by molding of a solid silicone or a plastic.

The sealed dome 56 is further pliable and is adapted to receive a tip of the nozzle 24 in a contiguously contacting manner so as to form a sealed connection. Preferably the sealed dome 56 may form a hermetic seal. The overall sealed dome 56 may have an overall length that includes a portion of the overall length. The portion of the overall length may be a portion of one half or less than one half of the overall length.

2. Operation of the Preferred Embodiment

Briefly described according to the operation of the present invention, the reusable sealing system 50 may be used to hermetically seal an opened nozzle 24 of a caulk tube or similar bulk dispenser 10. The nozzle 24 is inserted into the access orifice 52 at a proximal end 54 and a sealed dome 56 received the distal-most tip of the nozzle 24. The system 50 has an overall length of approximately 3½ inches to receive the entire nozzle 24. Further, the access orifice 52 has an opening diameter of approximately ⅝" nominal internal diameter to receive and circumferentially seal about a base of the nozzle 24.

The sealed dome 56 can be grasped by a user between one's first finger and thumb and easily remove from the tip of the nozzle 24 in order to regain access to the contents 18 of the tube 10.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. In a bulk container forming a hollow cylinder containing a flowable bulk material dispensed from an applicator tip at a distal end by urging a movable plunger at a proximal end, the movable plunger being urged using a flow gun device, wherein the improvement comprises a reusable sealing system for sealingly encasing, enclosing and nesting said applicator tip and further comprising:
   a cylindrical member formed of a sidewall having at least a portion being ductile and further forming an access orifice at a proximal end and being sealed at an opposite, distal end, said sealed end formed as a flattened extension of the sidewall, wherein said sidewall is formed of a compressible silicone or a plastic and is further adapted to receive a tip of the nozzle in a contiguously contacting manner;
   an overall length of said cylindrical member being approximately 3½ inches;
   said access orifice forming an opening diameter of approximately ⅝" nominal internal diameter.

2. The sealing system of claim 1, wherein said sidewall is formed of a compressible elastomeric material.

3. The sealing system of claim 1, wherein said sidewall is formed of a compressible silicone or a plastic.

* * * * *